United States Patent [19]

O'Leary et al.

[11] Patent Number: 4,812,809
[45] Date of Patent: Mar. 14, 1989

[54] CIRCUIT FOR CHECKING THE COINCIDENCE OF A DATA WORD WITH A REFERENCE DATA WORD

[75] Inventors: Paul O'Leary, Gundelfingen; Hans-Josef Orben, Heuweiler, both of Fed. Rep. of Germany

[73] Assignee: Deutsche ITT Industries GmbH, Freiburg, Fed. Rep. of Germany

[21] Appl. No.: 30,043

[22] Filed: Mar. 23, 1987

[30] Foreign Application Priority Data

Mar. 22, 1986 [EP] European Pat. Off. ........... 86103945

[51] Int. Cl.$^4$ .............................................. G06F 7/02
[52] U.S. Cl. ................................................ 340/146.2
[58] Field of Search ...................... 340/146.2; 364/728

[56] References Cited

U.S. PATENT DOCUMENTS

| | | | |
|---|---|---|---|
| 3,656,109 | 4/1972 | Conway | 340/146.2 |
| 3,796,868 | 3/1974 | Kavl et al. | 364/728 |
| 3,818,348 | 6/1974 | Puente | 325/324 |
| 4,153,946 | 5/1979 | Upton | 364/900 |
| 4,498,141 | 2/1985 | Cooper | 364/728 |
| 4,694,274 | 9/1987 | Shimada et al. | 340/146.2 |
| 4,752,763 | 6/1988 | Hoffman | 340/146.2 |

FOREIGN PATENT DOCUMENTS

| | | | |
|---|---|---|---|
| 1221820 | 7/1966 | Fed. Rep. of Germany | 42/14 |
| 2296966 | 7/1976 | France | 19/08 |

Primary Examiner—David H. Malzahn
Attorney, Agent, or Firm—Thomas L. Peterson

[57] ABSTRACT

A circuit checks for coincidence of a data word with a reference data word by means of EXOR gates per digit of the two data words, and a non-coincidence is permitted in a number of digits (m). The output signal that appears at the output of the circuit is the result of the current flowing therein, with the sign thereof being indicative of either a coincidence or a non-coincidence. For this purpose, the individual outputs of the EXOR gates serve to activate switch transistors with the aid of which standard currents (i) are caused to flow from the output, via an N-multiple current source, to the zero point of the circuit (ground). On the other hand, via a first P-current mirror, a current mi and, via a second P-current mirror, a current i/2 are fed to the output. By means of the N-multiple current source, the current mi is impressed upon the current input of the first P-current mirror.

4 Claims, 1 Drawing Sheet

4,812,809

CIRCUIT FOR CHECKING THE COINCIDENCE OF A DATA WORD WITH A REFERENCE DATA WORD

BACKGROUND OF THE INVENTION

The present invention relates to a circuit for checking the coincidence of a data word with a reference data word with the aid of one EXOR gate each per digit of the two data words, and for transmitting a coincidence signal. The circuit is selectable with respect to the number of digits the data word may deviate from the reference data word.

There has been a long-felt need for such a circuit in the fields of digital data processing. For example, the circuit can be used in digital data transmission, wherein individual data words are used for synchronizing purposes, as is the case with the latest Satellite Broadcasting Standard D2-MAC. The circuit can also be used in cases where certain data words are used for encoding the data, and where the data words are required for the decoding, such that it is necessary to carry out a coincidence check.

SUMMARY OF THE INVENTION

The object of the present invention is to provide a circuit that allows an acceptable deviation between a reference data word and a data word to be checked. Moreover, the circuit is to be monolithically integrable by requiring as little crystal surface as possible, and is to operate at a high speed.

BRIEF DESCRIPTION OF THE DRAWINGS

The invention will now be explained in greater detail with reference to FIGS. 1 and 2 of the accompanying drawings, in which.

DETAILED DESCRIPTION OF THE DRAWING

Figure 1:
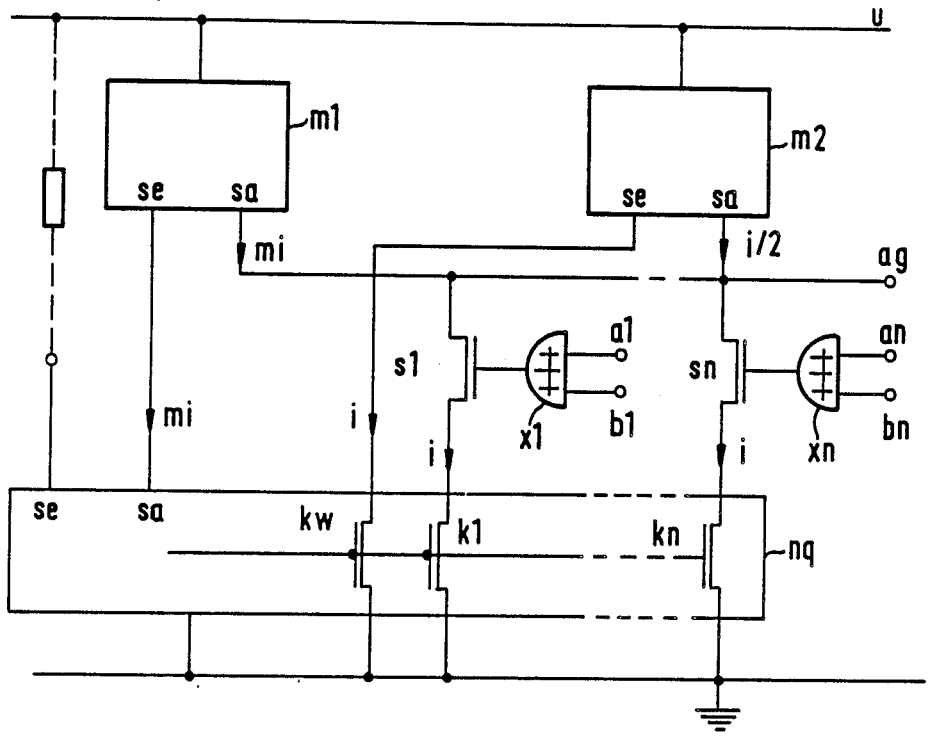
FIG. 1, schematically and partly in the form of a block diagram, shows the principle underlying the present invention.

With regard to the following description of the accompanying drawings, it should be assumed that both the data word and the reference data word consist of n digits and that of these, m digits may be faulty. Of the n stages of the circuit, the first and the last one, indicated by the reference indices 1 and n respectively, are shown in FIG. 1. The circuit itself is realized in accordance with the known complementary techniques, which means to imply that it is realized by using bipolar PNP and NPN transistors, or preferably in accordance with the complementary insulated-gate field-effect transistor technology, hence in accordance with the so-called CMOS technology.

The data word a1 . . . an which is to be checked, is applied digit by digit to the first inputs of the EXOR gates x1 . . . xn. The reference data word b1 . . . bn is applied to the respective second inputs of the EXOR gates x1 . . . xn. The output of each EXOR gate x1 . . . xn is applied to the gates of the respective switch transistors s1 . . . sn. One end of the source-drain section of each of the transistors s1 . . . sn is applied to the zero point (ground) of the circuit, while the other end of the source-drain section of each of the transistors s1 . . . sn is applied to the output ag of the circuit via a respective source-drain section of the constant-current N-transistors k1 . . . kn. In cases where both the data word and the reference data word have an equal number of digits, the associated switch transistor is rendered conductive by the output signal of the associated EXOR gate in cases where the herein assumed positive logic exists. The respective current outputs sa of the first P-current mirror m1 and of the second P-current mirror m2 are likewise applied to the output ag. (It should be noted that the prefix "P-" indicates PNP transistors or P-channel transistors, and that the prefix "N-" indicates NPN or N-channel transistors.)

The constant-current N-transistors k1 . . . kn are so dimensioned that each of them is capable of conducting the standard current i. Moreover, they form part of the N-multiple current source nq whose current output sa is connected to the current input se of the first P-current mirror m1. This current output sa conducts such a multiple mi of the standard current i as corresponds to the number m of digits with which the data word a1 . . . an is allowed to deviate from the reference data word b1 . . . bn, i.e. it conducts the m-fold standard current i. The current output sa of the second P-current mirror m2 conducts half the standard current i/2, while its current input se is connected to the output of the further constant-current N-transistor kw of the N-multiple current source nq, which transistor conducts the standard current i.

By impressing a corresponding, suitable input current upon the current input se of the N-multiple current source nq, it is possible for the just mentioned input currents to be adjusted. This may be effected, for example, in that the current input se of the N-multiple current source nq is connected to the source of supply voltage u across a resistor, as is indicated by the dashed line in FIG. 1. Relative thereto, the respective resistance value depends on both the intensity of the standard current i and on the dimensioning of the associated input transistor, in the known manner.

Figure 2:
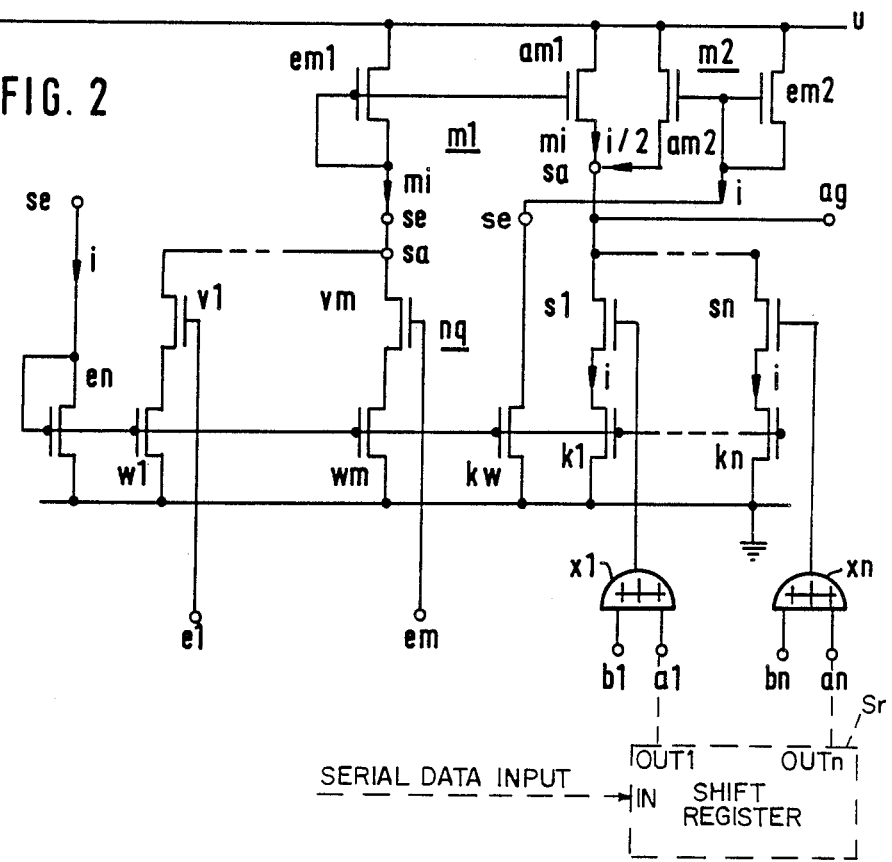
FIG. 2 shows the schematized circuit diagram of one preferred example of an embodiment of the present invention.

FIG. 2 shows a preferred embodiment of the arrangement according to FIG. 1, realized in accordance with the known CMOS technology. The N-multiple current source nq contains the input transistor en having one end of its source-drain section connected to the zero point of the circuit. The gate of the input transistor en is connected to the other end of its source-drain section, and thereby to the current input se. Moreover, there are provided m further constant current transistors w1 . . . wm, with one end of each of their source-drain sections being connected to the zero point of the circuit (ground). The other ends of the source-drain sections of the transistors w1 . . . wm are connected, via the source-drain sections of respective further switch transistors v1 . . . vm, to the current output sa of the N-multiple current source nq and, accordingly, to the current input of the first P-current mirror m1. The respective gates of the further constant-current transistors w1 . . . wm are each fed with the corresponding digit of the adjusting signal e1 . . . em. So many of the constant-current transistors w1 . . . wm are rendered conductive as correspond to the number of m digits by which the data word a1 . . . an is permitted to deviate from the reference data word b1 . . . bn.

One pole of the source-drain section of the input transistor em1 of the first P-current mirror m1 is connected to the source of supply voltage. The gate of the input transistor em1 of the first P-current mirror m1 is connected to the other pole of its source-drain section and to the gate of the output transistor am1 of the first P-current mirror m1, and is applied to the current input se. The source-drain section of the output transistor am1 is connected with one end to the source of supply voltage u and, with its other end to the current output sa of the first P-current mirror m1. The current output sa of the first P-current mirror m1 is connected to the current output sa of the second P-current mirror m2. One end of the source-drain section of the output transistor am2 of the second P-current mirror m2 is connected to the current output sa. An input transistor em2 of the second P-current mirror m2 has one end of its source-drain section connected to the source of voltage supply u. The gate of the input transistor em2 is connected to the other end of its source-drain section as well as to the gate of the output transistor am2. The gate of the input transistor em2 thus forms the current input se of the second P-current mirror m2, which in turn, is connected to the current input se of the N-multiple source nq.

In the example of the embodiment as shown in FIG. 2, the standard current i is impressed upon each of the two last mentioned current inputs se. The standard current i may be generated, for instance, with the aid of a correspondingly dimensioned resistor.

Owing to the two employed current mirrors and the multiple current source, it is possible to do without the use of an expensive adder circuit at the outputs of the EXOR gates x1 ... xn with which it would be necessary per se to detect the number of coincidences of the individual digits of the data word with those of the reference data word. Quite depending on whether the number m of admitted or allowed faulty digits occurs, either a positive or a negative current will flow via the output ag of the circuit arrangement. This dependence upon the direction of current flow represents a binary signal suitable for being further processed in a corresponding circuit.

In order to illustrate and make the matter more easily understandable, it will be assumed that m=2, i.e., that the current 2i flows to the output ag from the first P-current mirror m1. If now, for example, three of the n switch transistors s1 ... sn have been rendered conductive by the EXOR gates x1 ... xn, because three digits were found not to be in coincidence, then, three times the standard current i (i.e., 3i) will flow from the output ag, so that the value $-i/2$ will result as the total current sum of this junction or branch point. However, if only two of the switch transistors s1 ... sn have been rendered conductive, because only two digits are found not to coincide, then the current sum for the junction of the output ag will amount to $+i/2$. Hence, as already mentioned hereinbefore, the change of sign of the current sum at the output ag serves as a digital signal for indicating the coincidence with respect to the selected admitted (or allowable) faulty coincidence.

Since, in the arrangement according to the present invention, the adder circuit which would normally be required at the output of the EXOR gates x1 ... xn, has been replaced by the above-described current mirror and current-source arrangement, the processing speed chiefly only depends on the technological parameters of the process employed for realizing the integrated circuit, hence, for example, on the parameters of the employed CMOS process.

In cases where the data word to be checked is not offered in parallel form, a series-parallel conversion becomes necessary which is most suitably carried out with the aid of a shift register sr. The serial data are read in via the serial data input of the shift register sr. The parallel outputs of the shift register sr are connected to the respective input of the EXOR gates x1 ... xn serving the respective digit of the data word.

What is claimed is:

1. A circuit for checking the coincidence of an input data word having a first plurality of digits with a reference data word also having said first plurality of digits, and for transmitting an active coincidence signal at an output thereof, said circuit being selectable as to the number of digits by which the input data word may deviate from the reference data word while continuing to provide said active coincidence signal, said circuit comprising:

an exclusive-OR (EXOR) gate for each of said first plurality of digits, each of said EXOR gates having a first input connected to receive a digit from said input data word and a second input connected to receive the corresponding digit from the reference data word;

a first switch transistor for each of said first plurality of digits, each of said switch transistors having a gate and a source-drain section, said source-drain section having a first end and a second end, the output of each of said EXOR gates being connected to the gate of a corresponding one of said first switch transistors to selectively activate said corresponding one of said first switch transistors when said digits applied to said first and second inputs of said EXOR gate differ, the first end of each of said first switch transistors being connected to said output of said circuit;

a first P-current mirror and a second P-current mirror, each having a current input and a current output, the respective current outputs of said first and second P-current mirrors being connected to the output of the circuit;

a multiple constant-current source comprising a second plurality of constant-current N-transistors, said second plurality of constant-current N-transistors comprising:

a first plurality of constant-current N-transistors corresponding to said first plurality of digits, each of said N-transistors having a source-drain section with a first end and a second end, each of said N-transistors being dimensioned to conduct a standard current, said first end of the source-drain section of each of said N-transistors being connected to the zero point of the circuit (ground), the second end of each of said source-drain section of each of said N-transistors connected to the second end of a respective one of said first switch transistors, said N-transistors operating to conduct a constant-current from said output of said circuit via said first set of switching transistors having a magnitude that varies in accordance with the number of digits by which said input data word differs from said reference data word;

an additional constant-current N-transistor having a source-drain section which conducts said standard current, said source-drain section having a first end and a second end, the first end being connected to said zero point of said circuit, the second end being connected to said current input of said second P-current mirror, said second P-current mirror responsive to said current input and providing a current on said output of said second P-current mirror equal to half said standard current; and a variable current output connected to the current input of said first P-current mirror, said variable current output conducting a multiple of the standard current, said multiple corresponding to the number of digits by which said input data word may vary from said reference data word and said circuit continue to provide said active coincidence signal.

2. The circuit as defined in claim 1, wherein multiple current source further comprises:

a second plurality of constant-current N-transistors, each comprising a source-drain section having a first end and a second end, said first end of said source-drain section being connected to the zero point of the circuit, each of said second plurality of constant-current transistors being dimensioned to conduct said standard current through its respective source-drain section and providing said standard current as an output from said second end of its source-drain section; and a switch transistor for each of said second plurality of constant-current N-transistors, each switch transistor having a source-drain section with first and second ends and a gate, the first end of each switch transistor connected to a respective second end of a corresponding one of said second plurality of constant-current N-transistors to receive said standard current output therefrom, said second ends of said switch transistors being connected to the current input of said first P-current mirror, the gates of said switch transistors being connected to an adjusting signal having a corresponding second plurality of digits, each of said digits of said adjusting signal controlling the conductivity of a respective one of said switch transistors, such that by applying respective digits of said adjusting signal to the respective gates of said further switch transistors so many of said further switch transistors are rendered conductive as correspond to the number of digits by which the input data word is permitted to deviate from the reference data word.

3. The circuit as defined in claim 1, wherein said circuit is realized in accordance with the known complementary insulated-gate field-effect transistor technology (CMOS technology).

4. The circuit as defined in claim 1, further including means for checking the coincidence of a serial input data word with said reference data word, said means for checking said serial data word comprising a shift register having a serial input and parallel outputs, said parallel outputs of said shift register corresponding to said first plurality of digits of said input data word, said serial data word being serially read into said shift register, each of said outputs of said shift register being connected to a respective first input of one of said EXOR gates.

* * * * *